Figure 1:
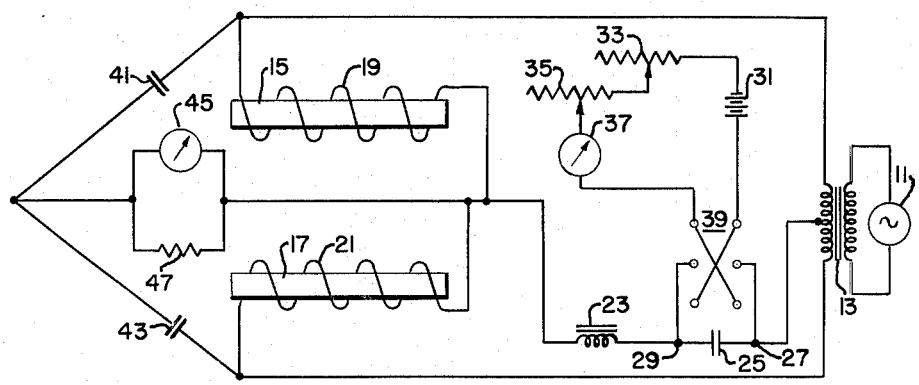

Sept. 28, 1965 C. Q. ADAMS 3,209,246
MAGNETIC FIELD DETECTOR WITH A TWO-CORE FLUX GATE
MAGNETOMETER FOR A D.C. PERMEAMETER
Filed March 23, 1961 4 Sheets-Sheet 1

*INVENTOR.*
CHARLES Q. ADAMS

BY
*ATTYS.*

Sept. 28, 1965  C. Q. ADAMS  3,209,246
MAGNETIC FIELD DETECTOR WITH A TWO-CORE FLUX GATE
MAGNETOMETER FOR A D.C. PERMEAMETER
Filed March 23, 1961  4 Sheets-Sheet 2

INVENTOR.
CHARLES Q. ADAMS

ATTYS.

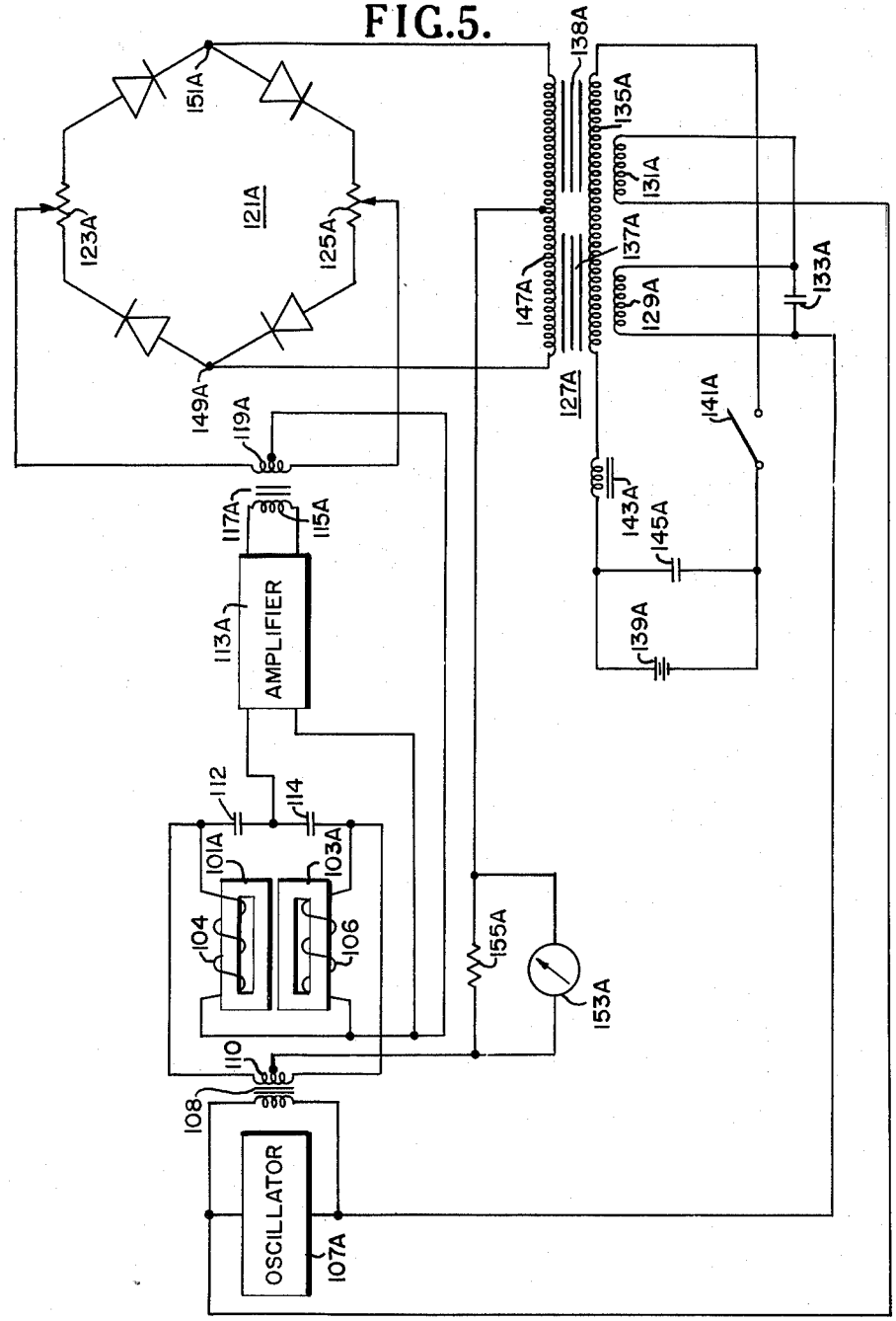

United States Patent Office 3,209,246
Patented Sept. 28, 1965

3,209,246
MAGNETIC FIELD DETECTOR WITH A TWO-CORE FLUX GATE MAGNETOMETER FOR A D.C. PERMEAMETER
Charles Q. Adams, Washington, D.C., assignor to the United States of America as represented by the Secretary of the Navy
Filed Mar. 23, 1961, Ser. No. 97,977
5 Claims. (Cl. 324—43)
(Granted under Title 35, U.S. Code (1952), sec. 266)

The invention described herein may be manufactured and used by or for the Government of the United States of America for governmental purposes without the payment of any royalties thereon or therefor.

This invention relates to a device for measuring magnetic properties of materials and more particularly to an improved second harmonic flux-gate magnetometer type permeameter.

The development of grain oriented magnetic materials has resulted in a need for improved instruments for measuring the magnetic qualities of these materials. In particular, the measurement of the permeability of single strips of ferromagnetic material depends upon satisfactory apparatus for measuring the magnetizing field, H. Prior art devices have been developed which operate on the same principle as that of airborne magnetometers used for measuring the earth's field. Such apparatus for obtaining the measurement of the magnetizing field of a sample includes the use of a small saturating core element of high permeability placed very close to the surface of the magnetized sample. When such a core is excited with an A.-C. voltage in the presence of a D.-C. field, even harmonics of the A.-C. voltage are introduced in exciting circuit by the D.-C. flux. The magnitude of the even harmonic voxltage, the second harmonic being the largest, is directly proportional to the magnitude of the D.-C. field. To obtain the magnitude of this unknown field, a D.-C. current is passed through the coil to produce a field in the opposite direction to the unknown field. When the second harmonic voltage disappears it is then known that the D.-C. field produced by the D.-C. current passed through the coil has produced a D.-C. field in the core which is equal to the unknown magnetic field. This apparatus, however, needed a selective amplifier tuned to the second harmonic frequency. Further, the A.-C. exciting current in the coil causes an A.-C. flux from the cord to go through the sample being measured and changes the magnetic field in that area. In the improved apparatus of this invention, two closely spaced cores are used which permits the elimination of the undesirable effects of such an A.-C. flux. The coils have been arranged in a bridge circuit which eliminates the need for selectively tuned amplifiers and filters.

An object of this invention is to provide apparatus for measuring magnetic properties of materials.

Another object of this invention is to provide a second harmonic flux-gate magnetometer for measuring the magnetic properties of high permeability grain oriented strip materials.

A further object of this invention is to provide apparatus for measuring magnetic properties of strip materials in which two closed magnetic core circuits are employed.

A still further object of this invention is to provide a permeameter for measuring magnetic properties of high permeability strip materials.

Another object of this invention is to provide a permeameter for measuring the magnetic properties of grain oriented materials in which the magnetizing field is measured by a bridge circuit containing two magnetic cores.

Yet another object of this invention is to provide a self-balancing magnetometer circuit for a permeameter in which two cores are employed.

Figure 2:
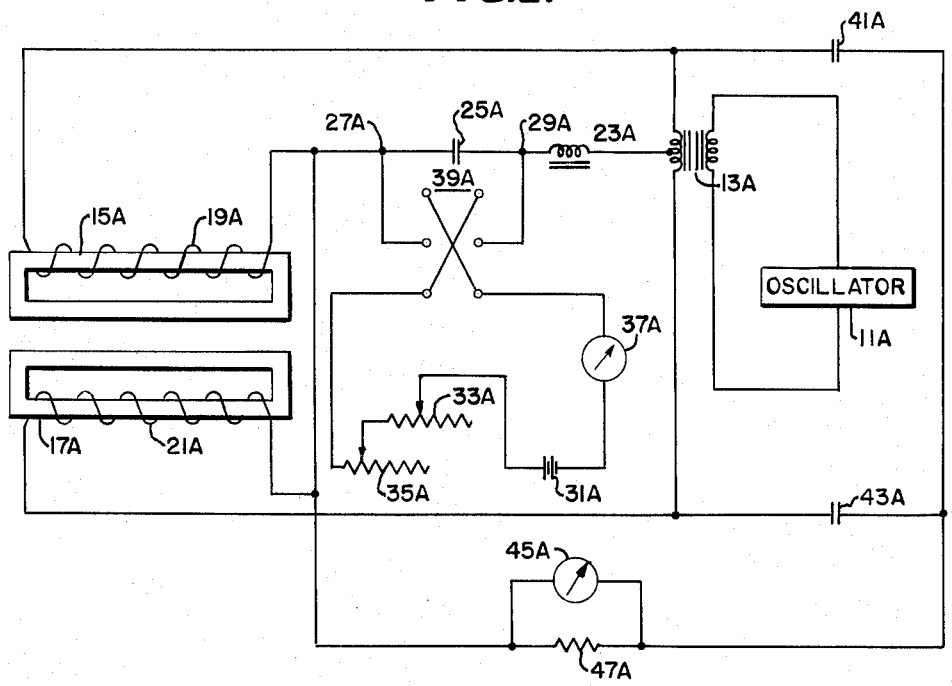
Figure 3:
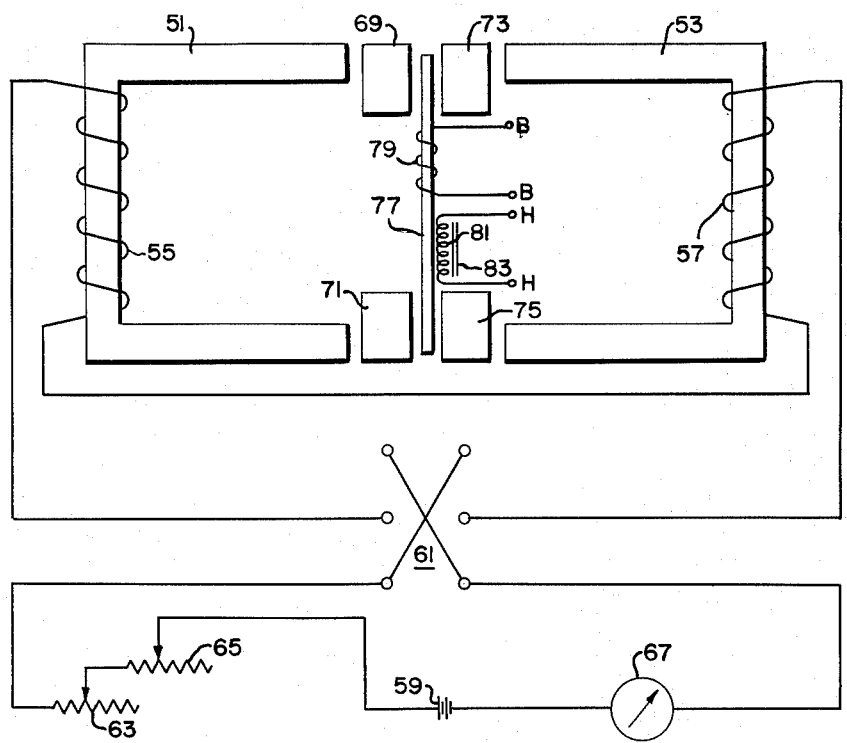
Figure 6:
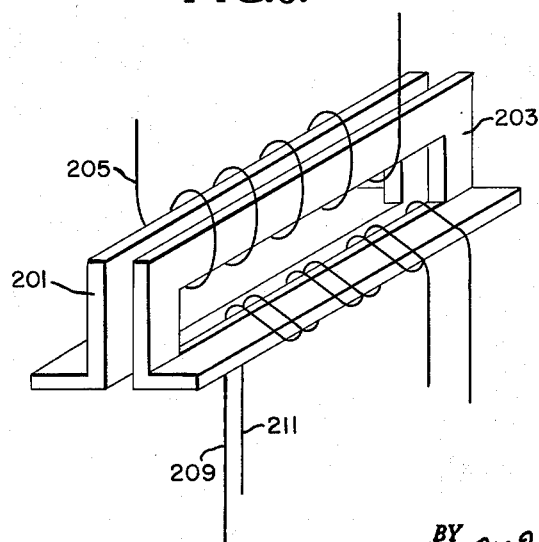
Figure 4:
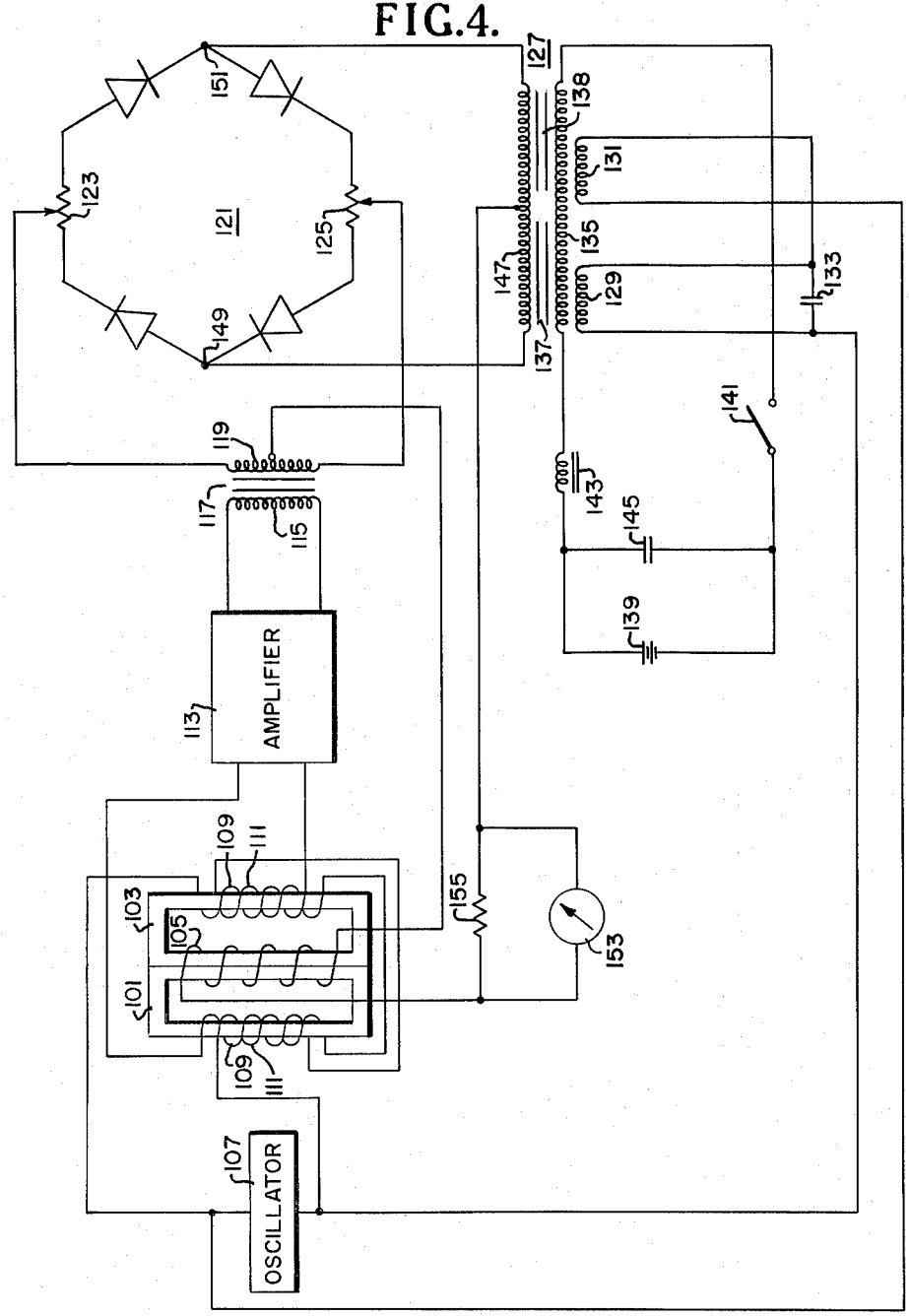

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 of the drawings illustrates an embodiment of the invention in which a magnetometer circuit employs two cores;

FIG. 2 of the drawings illustrates another embodiment of the magnetometer circuit in which closed core are employed;

FIG. 3 of the drawings illustrates a typical exciting circuit for a permeameter;

FIG. 4 of the drawings illustrates a magnetometer circuit of this invention employing a self-balancing circuit;

FIG. 5 of the drawings illustrates another embodiment of the self-balancing magnetometer circuit; and FIG. 6 of the drawings illustrates an alternate embodiment of the magnetometer cores.

Referring now to FIG. 1 of the drawings in which an embodiment of the two core magnetizing field measuring circuit is shown, an oscillator or generator 11 connects to the primary winding of transformer 13. Cores 15 and 17 have windings 19 and 21 respectively which are connected for energization to the secondary winding of transformer 13 through inductor 23 and capacitor 25. Windings 19 and 21 are connected in such a manner as to constrain the A.-C. flux to the cores in order to reduce the undesirable effects of the A.-C. flux on the sample of the material to be measured. That is, windings 19 and 21 are connected in series-opposing relationship. The series-opposing relationship of windings 19 and 21 also permits the use of these windings for D.-C. opposing field current. A D.-C. voltage may be applied to windings 19 and 21 at terminals 27 and 29 from D.-C. voltage source 31. D.-C. voltage source 31 is connected to terminals 27 and 29 through resistors 33, 35, meter 37 and polarity-reversible switch 39. Windings 19 and 21 form legs of a Wheatstone bridge arrangement with capacitors 41 and 43 serving as the other legs. Meter 45 and shunt resistor 47 are connected to the bridge circuit for measuring an unbalance of current flow in the bridge network.

Referring now to FIG. 2 of the drawings in which an embodiment of the H measuring circuit of this invention including two closed magnetic path cores is shown, an oscillator or generator 11A connects to the primary winding of transformer 13A. Cores 15A and 17A have windings 19A and 21A, respectively, which are connected for energization to the secondary winding of transformer 13A through inductance 23A and capacitor 25A. Windings 19A and 21A are connected in series-opposing relationship. The undesirable effects of the A.-C. exciting flux on the sample is elimiated by the rectangular shape of the cores which provides closed magnetic paths for the A.-C. exciting flux. A D.-C. voltage is applied to windings 19A and 21A at terminals 27A and 29A from D.-C. voltage source 31A. D.-C. voltage source 31A is connected to terminals 27A and 29A through resistors 33A, 35A, meter 37A and polarity-reversible switch 39A. Windings 19A and 21A form legs of a Wheatstone bridge arrangement with capacitors 41A and 43A serving as the other legs. Meter 45A and shunt resistor 47A are connected to the bridge circuit for measuring an unbalance of current flow in the bridge network.

Referring now to FIG. 3 of the drawings in which typical permeameter yokes and exciting circuit are illustrated for the permeameter, permeameter yoke cores 51 and 53 are supplied with windings 55 and 57. Windings 55 and 57 are serially connected to D.-C. voltage source 59 through polarity reversible switch 61. Variable resistors 63 and 65 are provided for adjusting the current flow through windings 55 and 57. A meter 67 is provided to indicate current flow in the exciting circuit. Blocks or pole pieces 69, 71, 73 and 75 are provided to complete the magnetic circuits from the yokes to sample 77. The sample of magnetic material 77 is positioned between the blocks 69, 71 and 73, 75. A coil or winding 79 is wrapped around the sample with as little air space as possible between coil 79 and the sample 77. Terminals B—B are adapted to be connected to a flux meter (not shown). This meter may be a conventional flux meter. Coil 81, schematically shown, is the magnetizing force measuring coil of the permeameter and terminals H—H connected to the bridge circuits as are the windings of FIG. 1 or FIG. 2, for example. In the present invention the coil 81 and core 83 are replaced by core and coil elements of the type shown in FIGS. 1 and 2. For example, the core elements 15, 17 and the windings 19 and 21 would be substituted for elements 81 and 83 of FIG. 3.

Referring now to FIG. 4 of the drawings in which an embodiment of the magnetometer having the self-balancing feedback circuit is shown, magnetometer cores 101 and 103 are supplied with a feedback or D.-C. winding 105. An oscillator 107 is connected to the exciting winding 109 of the magnetometer cores 101 and 103. A pick-up winding 111, also wound on cores 101 and 103, is connected to an amplifier 113 which, by way of example, may be a conventional electronic powered amplifier. The output of amplifier 113 is fed to primary winding 115 of a transformer having a high permeability core 117 and a center-tapped secondary winding 119. A ring modulator 121 having four diodes and potentiometers 123 and 125 is employed as a phase-sensitive rectifier. Secondary winding 119 connects to the variable taps of potentiometers 123 and 125. A frequency doubling transformer 127 is provided having primary winding 129 and 131 which are connected in series opposition to oscillator 107. A capacitor 133 is connected across the terminals of winding 129, if necessary, to compensate for circuit component inequalities. A D.-C. winding 135 wound on cores 137 and 138 is connected to a D.-C. voltage source 139 through switch 141. An inductor 143 and a capacitor 145 serve as a filter circuit to filter A.-C. voltages out of the D.-C. circuit including winding 135. The secondary winding 147 of the frequency doubling transformer 127 is connected across junction points 149 and 151 of ring modulator 121. Feedback or D.-C. winding 105 is connected to the center taps of windings 119 and 147. A meter 153 and a shunt resistor 155 are also connected into the feedback circuit for indicating the magnitude of the feedback current.

Referring now to FIG. 5 of the drawings there is shown another embodiment of the magnetometer with a self-balancing circuit in which magnetic cores 101A and 103A are supplied with windings 104 and 106. An oscillator 107A is connected to the windings through transformer 108 having a center-tapped secondary winding 110. A bridge circuit is formed by capacitors 112 and 114 and windings 104 and 106. Amplifier 113A connects across the bridge circuit thus formed. The output of amplifier 113A is fed to primary winding 115A of a transformer having a high permeability core 117A and a center-tapped secondary winding 119A. A ring modulator 121A having four diodes and potentiometers 123A and 125A is employed as a phase-sensitive rectifier. Secondary winding 119A connects to the variable taps of potentiometers 123A and 125A. A frequency doubling transformer 127A is provided having primary windings 129A and 131A which are connected in series opposition to oscillator 107A. A capacitor 133A is connected across the terminals of winding 129A, if necessary, to compensate for circuit component inequalities. A D.-C. winding 135A wound on cores 137A and 138A is connected to D.-C. voltage source 139A through switch 141A. An inductor 143A and a capacitor 145A serve as a filter circuit to filter A.-C. voltage out of the D.-C. circuit including winding 135A. The secondary winding 147A of the frequency doubling transformer 127A is connected across junction points 149A and 151A of the ring modulator 121A. The D.-C. feedback is applied from the center taps of windings 119A and 147A to windings 104 and 106. A meter 153A and a shunt resistor 155A are conected into the feedback circuit to indicate the magnitude of the feedback current.

Referring now to FIG. 6 of the drawings in which an alternate form of a magnetometer element is shown, cores 201 and 203 are L-shaped with A.-C. energizing winding 209 and pickup winding 211 on the outer legs and D.-C. feedback winding 205 on the inner legs. This embodiment of the magnetometer element may be used in place of cores 101 and 103 of FIG. 4.

Referring now to FIGS. 1 and 3 of the drawings for the operation of the magnetometer circuits, permeameter yoke cores 51 and 53 are excited by connecting D.-C. source 59 to the windings 55 and 57 of the yoke cores. The desired polarity of exciting voltage may be selected by the setting of polarity reversible switch 61. The amount of exciting current may be regulated to the desired level by adjusting the tap positions of variable resistors 63 and 65. Current flow through the exciting circuit will be measured by meter 67. When the yoke core windings are energized, magnetic flux paths are set up in sample 77 from core 51 through blocks 69 and 71 and from core 53 through blocks 73 and 75. The flux density may then be measured by connecting a flux meter to terminals B—B of winding 79. Coil 81 with core 83 and terminals H—H corresponds to the magnetometer element of the magnetometer circuit such as cores 15 and 17 and coils 19 and 21, respectively, of FIG. 1. The magnetometer element is placed close to the surface to sense the magnetic field at the surface of sample 77. The magnetizing force at the surface of the sample, once sensed by the magnetometer elements, is measured in the magnetometer circuit, for example, the circuit of FIG. 1. When the bridge circuit comprising windings 19 and 21 and capacitors 41 and 43 are excited by a 4 kc. voltage from oscillator 11, the current flow in the bridge is balanced and there is no current flow through the indicating circuit comprising meter 45 and resistor 47. When the magnetometer elements are placed in the magnetic field at the surface of the sample under test, however, the D.-C. field induced in cores 15 and 17 causes an unbalance in the bridge circuit and a current which is the second harmonic of the oscillator frequency, flows in the indicator circuit. The D.-C. field in the cores created by the magnetic field at the surface of the sample under test may be cancelled out by a D.-C. field in the opposite direction in cores 15 and 17. This opposing field may be created by applying a D.-C. current through windings 19 and 21 from D.-C. source 31. Switch 31 is set to provide the proper polarity and then resistors 33 and 35 are adjusted until the current flow through the inductor circuit of the bridge is zero as shown by meter 45. The D.-C. current necessary to balance the bridge is proportional to the magnetic field at the surface of the sample and may be determined from reading meter 37. In this manner, the magnetizing force, H, is measured. The operation of the magnetometer circuit of FIG. 2 is identical to that of FIG. 1.

Referring now to FIG. 4 of the drawings, the operation of the self-balancing magnetometer circuits, the magnetometer elements including cores 101 and 103 and windings 109 and 111 are placed immediately adjacent to the surface of the sample of material to be tested, such as sample 77 in FIG. 3. The magnetometer elements of FIG. 4 would replace winding 81 and core 83 shown in FIG. 3.

Windings 109 and 111 are wound on cores 101 and 103 in such a manner as to produce the greatest amount of second harmonic current output. That is, windings 109 and 111 are wound effectively in the same sense on core 101 and opposite sense on core 103. This may be accomplished by connecting the tops of winding 109 on both cores 101 and 103 to the oscillator terminals while connecting the top of winding 111 on core 101 to the amplifier and the bottom of winding 111 on core 103 to the amplifier. When there is no D.-C. field in the presence of magnetometer cores 101 and 103 there will be no voltage output from winding 111 and no feedback current flowing in winding 105. When the magnetometer elements are placed immediately adjacent to the surface of a magnetically energized sample such as sample 77 of FIG. 3, a D.-C. field will be set up in cores 101 and 103 and a current having a frequency of the second harmonic of the oscillator will flow in winding 111. This second harmonic current will be amplified by amplifier 113 and applied to the ring modulator 121 through the variable taps of potentiometers 123 and 125. At the same time switch 141 will be closed and the biasing of cores 137 and 138 by D.-C. winding 135 will occur, causing another second harmonic voltage of oscillator 107 to appear at terminals 149 and 151, which voltage is applied to the ring modulator. This voltage is of greater magnitude than that produced by amplifier 113. With the application of the two second harmonic voltages to the ring modulator, a D.-C. feedback voltage will be produced at the center taps of windings 119 and 147. This D.-C. feedback voltage is linearly proportional to the magnitude of the second harmonic current in winding 111 and will have a polarity dependent upon the phase relationship of the second harmonic voltage across the terminals of winding 119 and the second harmonic voltage appearing across the terminals of winding 147. The ring modulator is thus acting as a phase sensitive rectifier. The magnitude of the D.-C. feedback current will be the amount necessary to equal the D.-C. field created in cores 101 and 103 of the magnetometer elements. The D.-C. feedback current may be read from meter 153. Meter 153 may be calibrated in terms of the magnetizing force, H, for direct readings.

The operation of the circuit of FIG. 5 is similar to that of FIG. 4 except that a bridge circuit similar to that of FIG. 1 is formed by windings 104 and 106 and capacitors 112 and 114. Amplifier 113A connects across the bridge circuit to amplify an unbalanced second harmonic current and apply this current to the terminals 121A and 125A of ring modulator 123A. The D.-C. feedback current is applied from the center taps of windings 119A and 147A to windings 104 and 106. This current will be such that the D.-C. field thus created in cores 101A and 103A will be equal and opposite to the D.-C. field set up in the cores by the magentic field of the energized sample material to be tested.

The yokes of the permeameter yokes may be made of laminations of material known in the art as 47–50 Nickel-Iron. The blocks or pole pieces of the permeameter are normally made from soft iron, but may be made from material known in the art as Supermalloy which has a lower coercive force than iron. The magnetometer cores may be made from material known in the art as Supermalloy. The transformer cores 137, 138, 137A and 138A of FIGS. 4 and 5 may be made from high permeability materials such as that known in the art as Supermalloy.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A permeameter having a pair of yoke cores, a sample of magnetic strip material adapted to be placed between said yokes, means for magnetically energizing said yoke cores whereby a magnetic field at the surface of said strip is set up, a coil wound around said strip and connected to a flux meter whereby the magnetic flux in said strip may be determined, a magnetometer circuit comprising a bridge circuit including a pair of inductor load means and a pair of capacitor load means, said pair of inductors each including a high permeability core having a winding thereon, said cores adapted to be placed on the surface of said strip in close parallel relationship whereby a magnetic field may be set up in said inductors, an A.-C. exciting voltage source connected to said bridge circuit and adapted to apply an A.-C. exciting flux to said cores, said windings connected in series opposing relationship to constrain the A.-C. exciting flux to said cores, a source of polarity reversible D.-C. voltage adapted to be connected to said inductor windings whereby a magnetic field may be set up in the inductor cores to oppose the magnetic field in the inductor cores caused by the magnetic field surrounding said strip, indicator means connected across the bridge circuit for reading a harmonic current flow which will flow when an A.-C. flux is applied to said inductor cores in the presence of a D.-C. magnetic field, means varying said D.-C. voltage source until the magnetizing field set up thereby in the cores is equal and opposite to the magnetizing field set up by the magnetic field at the surface of said strip, meter means connected to the D.-C. voltage source for indicating the current necessary for completely opposing the magnetizing field caused by the magnetic field at the surface of said strip.

2. In a permeameter having a yoke circuit for generating a D.-C. magnetic field in a strip of magnetic material, and a coil surrounding said material for detecting the flux density, a magnetometer circuit comprising a magnetometer element having two closely-spaced inductor cores with a winding on each of said cores, said cores placed at the surface of said material for sensing the D.-C. magnetic field therein, a bridge circuit having four load means consisting of two capacitors and the windings on said cores, an A.-C. voltage oscillator connected to said bridge circuit for supplying an A.-C. exciting field to said cores, said windings connected in series opposition such that the A.-C. field will be confined to said cores, whereby harmonic voltages generated in said windings due to the presence of said A.-C. field and said D.-C. field in said inductor cores will cause said bridge circuit to become unbalanced, means connected across said bridge to indicate the presence of a harmonic voltage, a polarity reversible D.-C. voltage source circuit connected to said windings, means varying the potential of the D.-C. voltage source whereby the D.-C. field in said windings may be completely opposed and the harmonic voltages reduced to zero, meter means indicating the amount of D.-C. current necessary to reduce the harmonic voltages to zero.

3. A self balancing magnetometer circuit for a permeameter for measuring the magnetic properties of a magnetic material placed in a D.-C. magnetic field comprising a magnetometer element having a first rectangular shaped core, a second rectangular shaped core, each of said cores having a closed magnetic circuit, a first winding on said first core and a second winding on said second core, a pair of capacitors, a bridge circuit comprising said first and second windings and said pair of capacitors, an A.-C. oscillator connected to said bridge circuit for energizing said circuit and applying an A.-C. field to said cores, said cores adapted to be placed at the surface of a magnetized material to sense the D.-C. magnetic field therein whereby second harmonic voltages will be produced when said A.-C. field and said D.-C. magnetic field are both present in said first and second cores, an amplifier having an input connected across said bridge circuit, means connecting an output of said amplifier to a transformer having a secondary winding with a center tap, means connecting said secondary winding of said transformer to a ring modulator circuit, a frequency doubling transformer having a center tapped secondary winding connected to said ring modulator, said frequency doubling transformer operative to produce a voltage having the second harmonic frequency of said oscillator, said first and second windings connected to the center tap of the secondary winding of said transformer and to the center tap of the secondary winding of said frequency doubling transformer such that the output of said ring modulator is fed to said first and second windings and such that the amplitude and polarity of an output voltage from said ring modulator will cancel out the D.-C. field set up in said first and second cores by said magnetic material, means indicating the magnitude of said output voltage.

4. A magnetometer circuit for sensing a D.-C. magnetic field in a magnetic material being magnetically energized by a permeameter comprising a first inductor having a first core and a first winding, a second inductor having a second core and a second winding, a first capacitor, a second capacitor, a bridge circuit formed by said first and second inductors and said first and second capacitors, an oscillator connected to said bridge circuit, said first and second inductors producing harmonic voltages when the inductors are energized by said oscillator in the presence of the D.-C. magnetic field, means connected across said bridge for indicating the magnitude of said harmonic voltages, a D.-C. voltage source circuit connected to said first and second windings and having a D.-C. voltage source, potential varying means, a meter, and polarity reversible means such that a D.-C. voltage of the magnitude and polarity necessary to completely oppose the D.-C. magnetic field of said magnetic material may be applied to said windings, said magnitude being indicated by said meter.

5. A magnetometer as in claim 4 in which said first and second inductor cores each have a hollow rectangular shape to provide a closed magnetic path.

References Cited by the Examiner

UNITED STATES PATENTS

| 2,446,939 | 8/48 | MacCallum | 324—43 |
| 2,721,974 | 10/55 | Schmitt | 324—43 |
| 2,836,791 | 5/58 | Kaplan | 324—43 |
| 3,159,785 | 12/64 | Beynan | 324—43 |

OTHER REFERENCES

Carr: "A New D.-C. Permeameter," Symposium on Magnetic Testing, American Society for Testing Materials, Publication No. 85, 1948, pages 63–79.

Mee et al.: "An Improved Precision Permeameter," Proceedings of the Institute of Electrical Engineering, December 1954, vol. 101, Part II, pages 639–42.

WALTER L. CARLSON, *Primary Examiner.*

FREDERICK M. STRADER, *Examiner.*